United States Patent
Daffin

(10) Patent No.: US 9,633,475 B2
(45) Date of Patent: Apr. 25, 2017

(54) MODELING GEOLOGIC SURFACES USING UNILATERAL NON-NODE CONSTRAINTS FROM NEIGHBORING SURFACES IN THE STRATIGRAPHIC SEQUENCE

(71) Applicant: Landmark Graphics Corporation, Houston, TX (US)

(72) Inventor: Thomas Chester Daffin, Denver, CO (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 42 days.

(21) Appl. No.: 14/646,491

(22) PCT Filed: Mar. 10, 2014

(86) PCT No.: PCT/US2014/022820
§ 371 (c)(1),
(2) Date: May 21, 2015

(87) PCT Pub. No.: WO2015/137916
PCT Pub. Date: Sep. 17, 2015

(65) Prior Publication Data
US 2016/0300384 A1 Oct. 13, 2016

(51) Int. Cl.
*G06T 17/05* (2011.01)
(52) U.S. Cl.
CPC ................... *G06T 17/05* (2013.01)

(58) Field of Classification Search
None
See application file for complete search history.

(56) References Cited

U.S. PATENT DOCUMENTS

| 4,679,174 A * | 7/1987 | Gelfand ................. G01V 1/282 367/38 |
| 2006/0253759 A1 | 11/2006 | Wei |
| 2007/0118291 A1 * | 5/2007 | Carttar ............. G06F 17/30241 702/5 |
| 2013/0112407 A1 | 5/2013 | Cheng et al. |
| 2013/0246031 A1 * | 9/2013 | Wu ..................... G06F 17/5009 703/10 |

FOREIGN PATENT DOCUMENTS

| WO | 0123829 A2 | 4/2001 |
| WO | 2005033739 A2 | 4/2005 |
| WO | 2009082563 A1 | 7/2009 |

OTHER PUBLICATIONS

Ferguson (Mathematics in Geology, Springer Science & Business Media, Nov. 11, 2013).*
Caumon, G., et al. "Surface-based 3D modeling of geological structures." Mathematical Geosciences 41.8 (2009): 927-945.*
(Continued)

*Primary Examiner* — Kee M Tung
*Assistant Examiner* — Xin Sheng
(74) *Attorney, Agent, or Firm* — Polsinelli PC

(57) ABSTRACT

Systems and methods for modeling three-dimensional ("3D") geologic surfaces, which represent a constraining surface and a constrained surface, in a stratigraphic conforming relationship that do not intersect or overlap.

20 Claims, 4 Drawing Sheets

(56) References Cited

OTHER PUBLICATIONS

Commissioner; International Search Report and the Written Opinion of the International Searching Authority; PCT/US14/22820; Dec. 2, 2014; 9 pgs.; ISA/KR.
Smith, W.H.F. and Wessel, P.; Gridding With Continuous Curvature Spines in Tension; Society of Exploration Geophysics, 55, 1990; pp. 293-305.
Briggs, I.C.; Machine Contouring Using Minimum Curvature; Society of Exploration Geophysics, 39, 1974; pp. 39-48.
Conformance within the Surface plane of the Dynamic Frameworks to Fill Workspace in Landmark Graphics Decision Space Geosciences software; DecisionSpace version 5000.8.3.1(help files); Dec. 20, 2013; 3 pages; Halliburton Energy Services; Houston, Texas.
Miller, Niel; First Examination Report; dated Aug. 9, 2016; 2 pages; Patent Application No. 2014386269; Australian Government Intellectual Property; Australia.

* cited by examiner

MODELING GEOLOGIC SURFACES USING UNILATERAL NON-NODE CONSTRAINTS FROM NEIGHBORING SURFACES IN THE STRATIGRAPHIC SEQUENCE

CROSS-REFERENCE TO RELATED APPLICATIONS

This application claims the priority of PCT Patent Application No. PCT/US14/22820, filed on Mar. 10, 2014, which is incorporated herein by reference.

STATEMENT REGARDING FEDERALLY SPONSORED RESEARCH

Not applicable.

FIELD OF THE DISCLOSURE

The present disclosure generally relates to systems and methods for modeling geologic surfaces using unilateral non-node constraints from neighboring surfaces in the stratigraphic sequence. More particularly, the present disclosure relates to modeling three-dimensional ("3D") geologic surfaces, which represent a constraining surface and a constrained surface, in a stratigraphic conforming relationship that do not intersect or overlap.

BACKGROUND

An important part of prospecting, drilling and developing oil fields is the construction of 3D geologic models of the subsurface stratigraphy (hereinafter 3D surface models). This can be done by collecting 3D data points that represent points on stratigraphic surfaces below the ground. The 3D data points may come from data collected during the drilling of wells in the region, or from other scientific evidence of the existence of surfaces below the ground. When building the 3D surface models from 3D data points, various constraints can be placed on the algorithms used to interpolate and extrapolate the 3D data points into the surfaces. One such constraint is the requirement for geologic conformance. For example, a surface that was deposited on top of a previously existing surface can often be said to conform to the earlier surface. It could also be said that the previously existing surface conforms to the later surface. Such a relationship implies that the two surfaces will not intersect each other when building a 3D surface model. It may also imply that a map of the distance between the two surfaces will obey some simple mathematical rule, such as possessing a minimum curvature.

One method for modeling 3D surfaces that are related in this way is to first build one of the surfaces (either the upper or the lower) using only the 3D data points that are thought to intersect that surface. The 3D surface built first is known as the constraining surface in the relationship. Then, the 3D data points of the second surface (known as the constrained surface) are transformed to a thickness domain by transforming the z values into vertical distances from the constraining surface. The 3D data points in the thickness domain are used to build a 3D surface model that represents the thickness between the two surfaces, which is also known as a thickness map. Finally, the constrained surface is built by adding the values for the nodes on a solution grid representing the 3D surface model to the z values for the constraining surface that will yield a 3D surface model of the constrained surface in the z domain. Because the 3D data points of the constrained surface are not taken into account when the constraining surface is built, the constraining surface may be built both above and below the 3D data points of the constrained surface leading to a thickness map with both positive and negative thicknesses. In other words, the constrained surface overlaps (intersects) the constraining surface in the z domain. The resulting overlap does not conform to the known geologic condition that the two surfaces were laid down by sedimentation in a stratigraphic sequence.

Other methods for modeling 3D surfaces attempt to prevent the constrained surface from overlapping the constraining surface either by requiring the thickness map to be built with all positive or all negative values (i.e. by imposing a global unilateral constraint on the thickness map) or by building the constrained surface after the constraining surface is built and imposing each node value of the constraining surface as a maximum or a minimum limit on each respective node value of the constrained surface (i.e. by imposing unilateral node constraints on the constrained surface). However, such methods may result in the constrained surface not intersecting some of the 3D data points that are thought to intersect it.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1A:
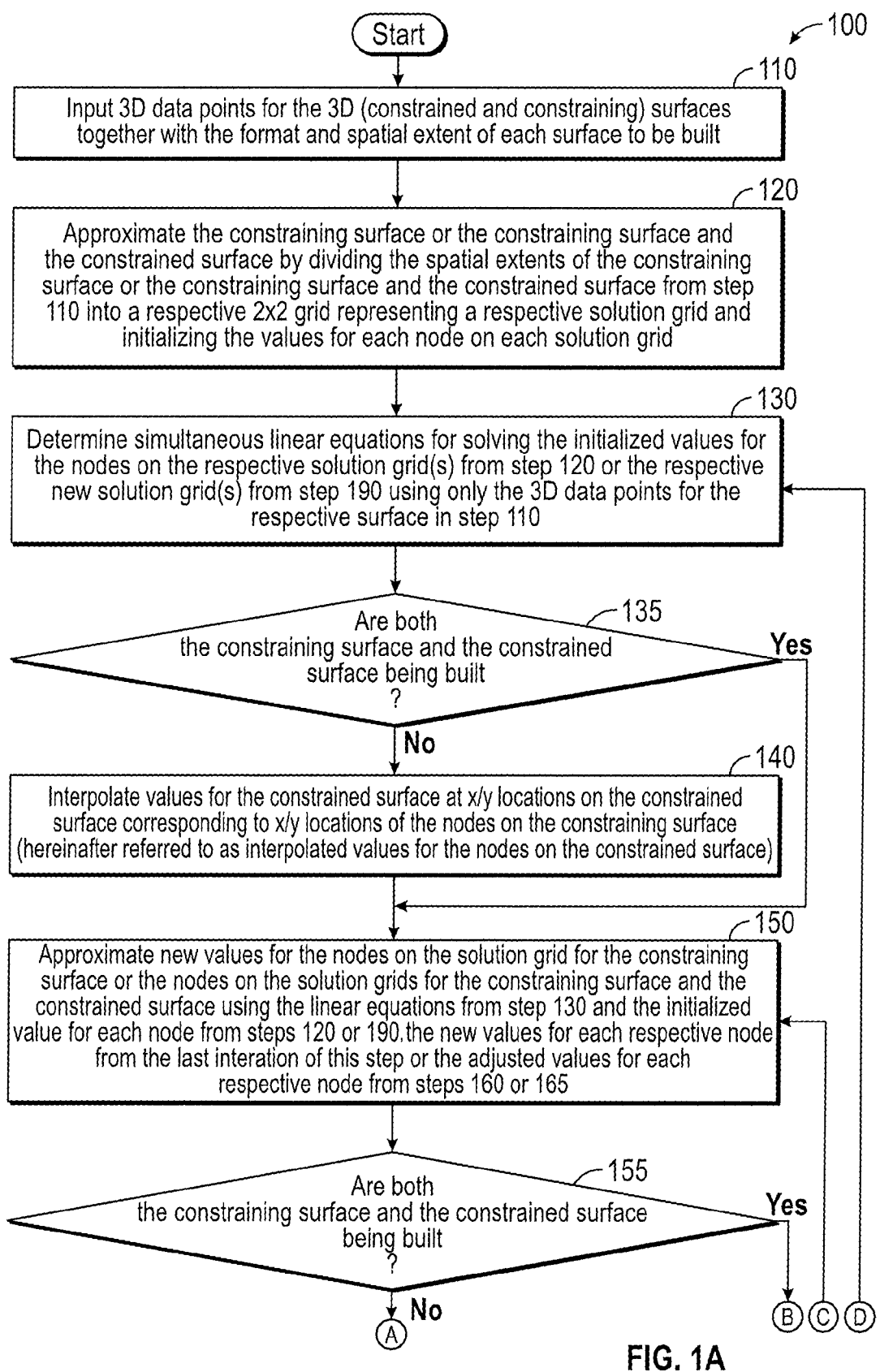
FIG. 1A is a flow diagram illustrating one embodiment of a method for implementing the present disclosure.

The present disclosure overcomes one or more deficiencies in the prior art by providing systems and methods for modeling three-dimensional ("3D") geologic surfaces, which represent a constraining surface and a constrained surface, in a stratigraphic conforming relationship that do not intersect or overlap.

In one embodiment, the present disclosure includes a method for modeling geologic surfaces using a constraining surface and a constrained surface, which comprises: a) approximating one of the constraining surface and the constraining surface and the constrained surface using a computer processor, each approximated surface representing a respective solution grid with at least four nodes, each node having an initialized value; b) determining simultaneous linear equations for solving the initialized values for the nodes on each respective solution grid using only three-dimensional data points for the respective one of the constraining surface and the constraining surface and the contained surface; c) performing one of: 1) interpolating values for the constrained surface at x/y locations on the constrained surface corresponding to x/y locations of the nodes on the solution grid for the constraining surface using the three-dimensional data points for the constrained surface only at x/y locations that are closest to the x/y locations of the nodes on the solution grid for the constraining surface, the interpolated values representing interpolated values for nodes on the constrained surface; and ii) approximating one of new values for the nodes on the solution grid for the constraining surface and new values for the nodes on the solution grids for the constraining surface and the constrained surface using the simultaneous linear equations and one of the initialized value for each node, new values for each respective node and adjusted values for each respective node; and d) performing one of: i) adjusting the new values for the nodes on the solution grid for the constraining surface that overlap the interpolated values for the nodes on the constrained surface; and 2) adjusting i) the new values for the nodes on the solution grid for the constraining surface that overlap the new values for the nodes on the solution grid for the constrained surface, and ii) the new values for the nodes on the solution grid for the constrained surface that overlap the new values for the nodes on the solution grid for the constraining surface.

In another embodiment, the present disclosure includes a non-transitory program carrier device tangibly carrying computer executable instructions for modeling geologic surfaces using a constraining surface and a constrained surface, which comprises: a) approximating one of the constraining surface and the constraining surface and the constrained surface, each approximated surface representing a respective solution grid with at least four nodes, each node having an initialized value; b) determining simultaneous linear equations for solving the initialized values for the nodes on each respective solution grid using only three-dimensional data points for the respective one of the constraining surface and the constraining surface and the contained surface; c) performing one of: 1) interpolating values for the constrained surface at x/y locations on the constrained surface corresponding to x/y locations of the nodes on the solution grid for the constraining surface using the three-dimensional data points for the constrained surface only at x/y locations that are closest to the x/y locations of the nodes on the solution grid for the constraining surface, the interpolated values representing interpolated values for nodes on the constrained surface; and ii) approximating one of new values for the nodes on the solution grid for the constraining surface and new values for the nodes on the solution grids for the constraining surface and the constrained surface using the simultaneous linear equations and one of the initialized value for each node, new values for each respective node and adjusted values for each respective node; d) performing one of: i) adjusting the new values for the nodes on the solution grid for the constraining surface that overlap the interpolated values for the nodes on the constrained surface; and 2) adjusting i) the new values for the nodes on the solution grid for the constraining surface that overlap the new values for the nodes on the solution grid for the constrained surface, and ii) the new values for the nodes on the solution grid for the constrained surface that overlap the new values for the nodes on the solution grid for the constraining surface.

In yet another embodiment, the present disclosure includes a non-transitory program carrier device tangibly carrying computer executable instructions for modeling geologic surfaces using a constraining surface and a constrained surface, which comprises: a) approximating one of the constraining surface and the constraining surface and the constrained surface, each approximated surface representing a respective solution grid with at least four nodes, each node having an initialized value; b) determining simultaneous linear equations for solving the initialized values for the nodes on each respective solution grid using three-dimensional data points for the respective one of the constraining surface and the constraining surface and the contained surface; c) performing one of: i) interpolating values for the constrained surface at x/y locations on the constrained surface corresponding to x/y locations of the nodes on the solution grid for the constraining surface using the three-dimensional data points for the constrained surface at x/y locations that are closest to the x/y locations of the nodes on the solution grid for the constraining surface, the interpolated values representing interpolated values for nodes on the constrained surface; and ii) approximating one of new values for the nodes on the solution grid for the constraining surface and new values for the nodes on the solution grids for the constraining surface and the constrained surface using the simultaneous linear equations and one of the initialized value for each node, new values for each respective node and adjusted values for each respective node; d) performing one of: 1) adjusting the new values for the nodes on the solution grid for the constraining surface that overlap the interpolated values for the nodes on the constrained surface; and 2) adjusting i) the new values for the nodes on the solution grid for the constraining surface that overlap the new values for the nodes on the solution grid for the constrained surface, and ii) the new values for the nodes on the solution grid for the constrained surface that overlap the new values for the nodes on the solution grid for the constraining surface; e) determining i) if the adjusted values for the nodes on one of the solution grid for the constraining surface and the solution grids for the constraining surface and the constrained surface represent an acceptable solution to the corresponding simultaneous linear equations, and ii) if a predetermined number of iterations of approximating new values has been reached; and f) repeating the steps of approximating new values and adjusting the new values until one of an acceptable solution to the corresponding simultaneous linear equations and a predetermined number of iterations of approximating new values is reached.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

Figure 1B:
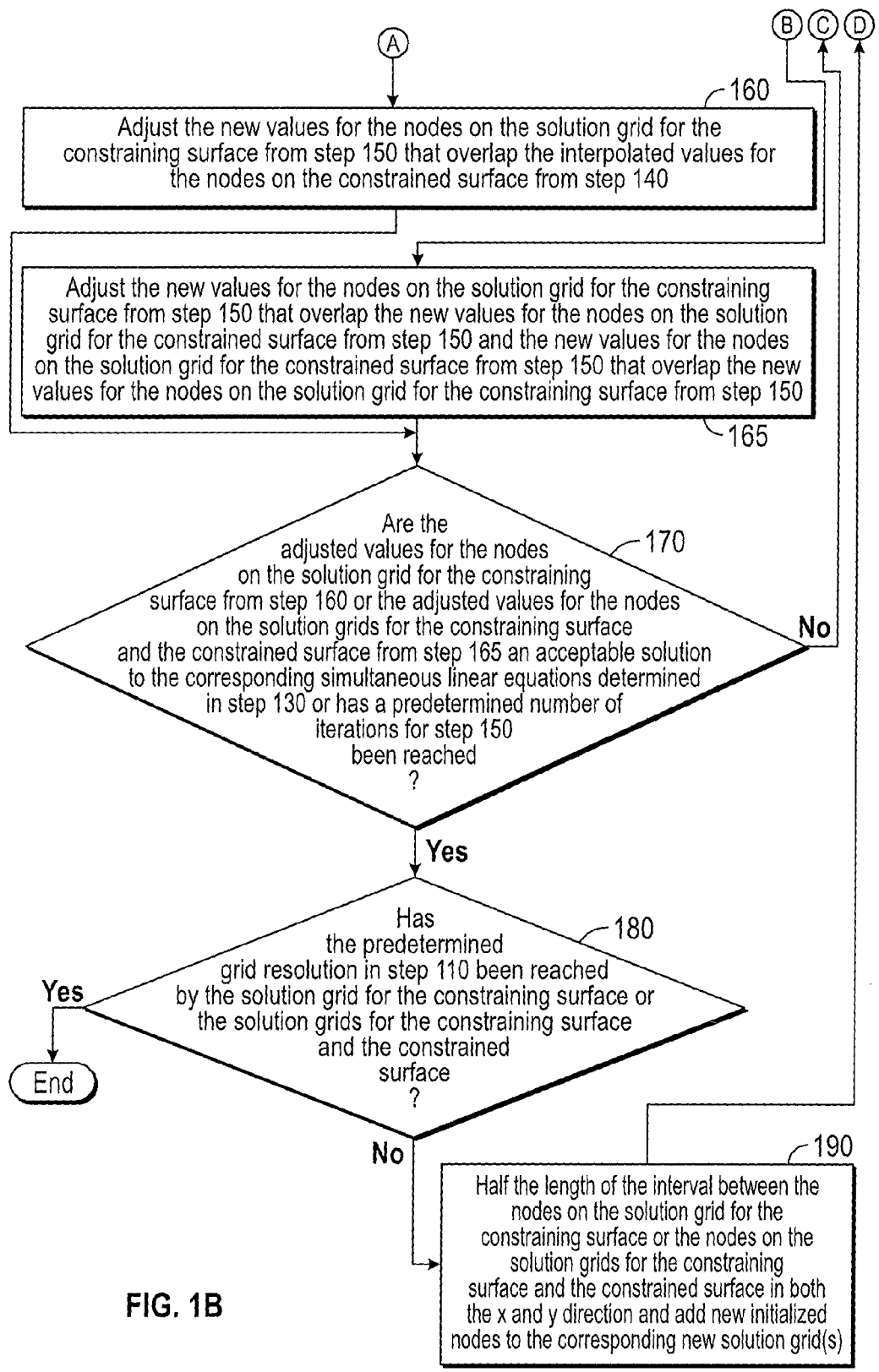
FIG. 1B is a flow diagram illustrating a continuation of the method illustrated in FIG. 1A.

Referring now to FIGS. 1A-1B, a flow diagram illustrates one embodiment of a method 100 for implementing the present disclosure. The method 100 builds 3D surface models that represent constraining and constrained surfaces in a stratigraphically conforming relationship that do not intersect each other or overlap. In one embodiment, 3D data points from the constrained surface may be used as maxima or minima while building the constraining surface. In this manner, the constraining surface will not have any 3D data points from the constrained surface on both sides of it. In another embodiment, both the constraining and constrained surfaces are built simultaneously so that they can be used as mutual minima or maxima and prevent their intersection or overlap.

Figure 4:
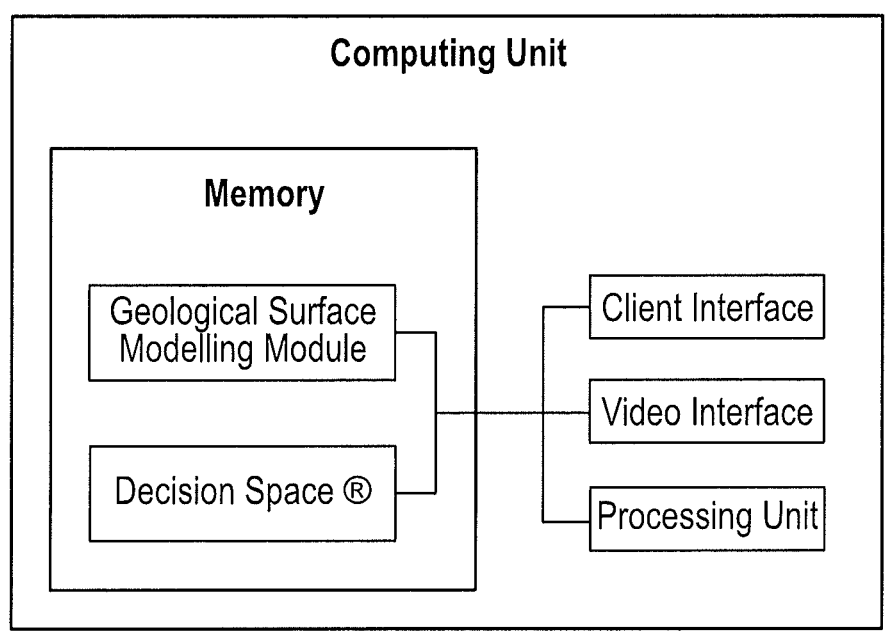
FIG. 4 is a block diagram illustrating one embodiment of a computer system for implementing the present disclosure.

In step 110, 3D data points for the 3D (constrained and constraining) surfaces are input together with the format and spatial extent of each surface to be built using the client interface and/or the video interface described further in reference to FIG. 4. As one example, either or both surfaces may be represented using a grid for the format and spatial extent of each surface to be built. The grid is used to represent a surface comprising a sequence of values (e.g. z-values representing depth, time or height) at each node of a regularly spaced grid. The nodes of the grid are the places where the lines of the grid cross. The grid covers a finite area of space in the x/y plane for each surface to be built. The extents of the grid represent a predetermined grid resolution, which are included in the format and spatial extent of each surface to be built and are defined by the minimum x/y grid node position, the length of the interval between nodes in both the x and y directions and the number of nodes in both the x and y directions.

In step 120, the constraining surface or the constraining surface and the constrained surface are approximated by dividing the spatial extents of the constraining surface or the constraining surface and the constrained surface from step 110 into a respective 2×2 grid (2 nodes in the x direction and 2 nodes in the y direction) representing a respective solution grid and initializing the values for each node. The values may be initialized to zero, the median z-value of the 3D data points input in step 110 for the respective surface or some other predetermined value.

In step 130, simultaneous linear equations are determined for solving the initialized values for the nodes on the respective solution grid(s) from step 120 or the respective new solution grid(s) from step 190 using only the 3D data points for the respective surface in step 110 and techniques well known in the art such as, for example, finite difference equations for a principal of minimum curvature.

In step 135, the method 100 determines if both the constraining surface and the constrained surface are being built. Solving both the constraining surface and the constrained surface may be preferred because it allows the two surfaces to have a symmetric relationship, where they are both effectively acting as the constrained surface and the constraining surface for each other. Alternatively, only the constraining surface may be preferred to be built in order to enhance the performance of the method 100 and produce a result more quickly. Furthermore, a variety of well-known techniques may be preferred to perform specific steps of the method 100 that are not available if both the constraining surface and the constrained surface are being built. If only the constraining surface is being built, then the method 100 proceeds to step 140. If both the constraining surface and the constrained surface are being built, then the method 100 proceeds to step 150.

In step 140, values for the constrained surface are interpolated at x/y locations on the constrained surface corresponding to x/y locations of the nodes on the solution grid for the constraining surface (hereinafter referred to as interpolated values for the nodes on the constrained surface) using the 3D data points for the constrained surface in step 110 only at x/y locations that are closest to the x/y locations of the nodes on the solution grid for the constraining surface and well known interpolating techniques such as Kriging. The number of values to be interpolated is limited to the lesser of the number of nodes on the solution grid for the constraining surface or the number of 3D data points for the constrained surface.

In step 150, new values for the nodes on the solution grid for the constraining surface or the nodes on the solution grids for the constraining surface and the constrained surface are approximated using i) the linear equations from step 130, ii) the initialized value for each node from steps 120 or 190, the new values for each respective node from the last iteration of this step or the adjusted values for each respective node from steps 160 or 165; and iii) techniques well known in the art such as, for example, the Jacobi method, the Gauss-Seidel method, successive over-relaxation or steepest descent. The new values represent an improved approximation of the constraining surface and the constrained surface.

In step 155, the method 100 determines if both the constraining surface and the constrained surface are being built. If only the constraining surface is being built, then the method 100 proceeds to step 160. If both the constraining surface and the constrained surface are being built, then the method 100 proceeds to step 165.

In step 160, the new values for the nodes on the solution grid for the constraining surface from step 150 that overlap the interpolated values for the nodes on the constrained surface from step 140 are adjusted so that the constraining surface and the constrained surface are not overlapping or intersecting. As an example, the new values for the nodes on the solution grid for the constraining surface from step 150 that overlap the interpolated values for the nodes on the constrained surface from step 140 are adjusted so that such new values are all less than or greater than such interpolated values. In this manner, the interpolated values for the nodes on the constrained surface from step 140 are used as unilateral node constraints, effectively rendering the 3D data points for the constrained surface as unilateral non-node constraints, on the new values for the nodes on the solution grid for the constraining surface from step 150.

In step 165, the new values for the nodes on the solution grid for the constraining surface from step 150 that overlap the new values for the nodes on the solution grid for the constrained surface from step 150 are adjusted and the new values for the nodes on the solution grid for the constrained surface from step 150 that overlap the new values for the nodes on the solution grid for the constraining surface from step 150 are adjusted so that the constraining surface and the constrained surface are not overlapping or intersecting. The new values for the nodes on each respective solution grid that overlap are adjusted in the same manner as described in step 160 except that the new values for the nodes on the solution grid for the constrained surface from step 150 that overlap the new values for the nodes on the solution grid for the constraining surface from step 150 are adjusted relative to the new (unadjusted) values for the nodes on the solution grid for the constraining surface from step 150. In this manner, the new values for the nodes on each respective solution grid are used as unilateral node constraints, effectively rendering the 3D data points for the constrained surface as unilateral non-node constraints on the solution grid for the constraining surface and the 3D data points for the constraining surface as unilateral non-node constraints on the solution grid for the constrained surface, on the new values for the nodes on each respective solution grid. Because surfaces are typically built separately in the order of a constraining surface and then a constrained surface, values for the nodes on the solution grid for the constrained surface have never been used as unilateral node constraints during the build of the constraining surface.

In step 170, the method 100 determines if the adjusted values for the nodes on the solution grid for the constraining surface from step 160 or the adjusted values for the nodes on the solution grids for the constraining surface and the constrained surface from step 165 represent an acceptable solution to the corresponding simultaneous linear equations determined in step 130 or if a predetermined number of iterations of step 150 has been reached. If the adjusted values for the nodes on the solution grid for the constraining surface from step 160 or the adjusted values for the nodes on the solution grids for the constraining surface and the constrained surface from step 165 do not represent an acceptable solution to the corresponding simultaneous linear equations determined in step 130 and if a predetermined number of iterations of step 150 (e.g. 10) has not been reached, then the method 100 returns to step 150. Otherwise, the method 100 proceeds to step 180. An acceptable solution to the corresponding simultaneous linear equations determined in step 130 can be determined by a variety of techniques well known in the art, such as checking if the residual of the adjusted values for the nodes on the solution grid(s) in the corresponding simultaneous linear equations is close enough to zero, or if the adjusted values for the nodes on the solution grid(s) have not changed by more than a predetermined value since the last iteration of this step.

In step 180, the method 100 determines if the predetermined grid resolution in step 110 has been reached by the solution grid for the constraining surface or the solution grids for the constraining surface and the constrained surface. The predetermined grid resolution in step 110 has been reached if the solution grid for the constraining surface or the solution grids for the constraining surface and the constrained surface have enough nodes in the x and y directions to match the number of nodes in the x and y directions input for the grid in step 110. If the predetermined grid resolution in step 110 has not been reached by the solution grid for the constraining surface or the solution grids for the constraining surface and the constrained surface, then the method 100 proceeds to step 190. Otherwise, the method 100 ends.

In step 190, the length of the interval between the nodes on the solution grid for the constraining surface or the nodes on the solution grids for the constraining surface and the constrained surface is halved in both the x and y direction and new initialized nodes are added to the corresponding new solution grid(s). In this manner, the solution grid for the constraining surface or solution grids for the the constraining surface and the constrained surface may be subdivided and still cover the same spatial extents of the constraining surface or the constraining surface and the constrained surface. As a result, the number of nodes for each solution grid will increase resulting in a greater grid resolution for each new solution grid. The adjusted values for the nodes on the solution grid for the constraining surface or the adjusted values for the nodes on the solution grids for the constraining surface and the constrained surface from steps 160 or 165, respectively, are retained at the same locations on the new solution grid(s). The values for the additional new nodes on the new solution grid(s) are interpolated between the retained adjusted values for the nodes on the new solution grid(s) using techniques well known in the art, which effectively initializes the retained adjusted values for the nodes on the new solution grid(s) and the values for the additional new nodes on the new solution grid(s). These initialized values for the nodes on the new solution grid(s) are returned to step 130.

Figure 2:
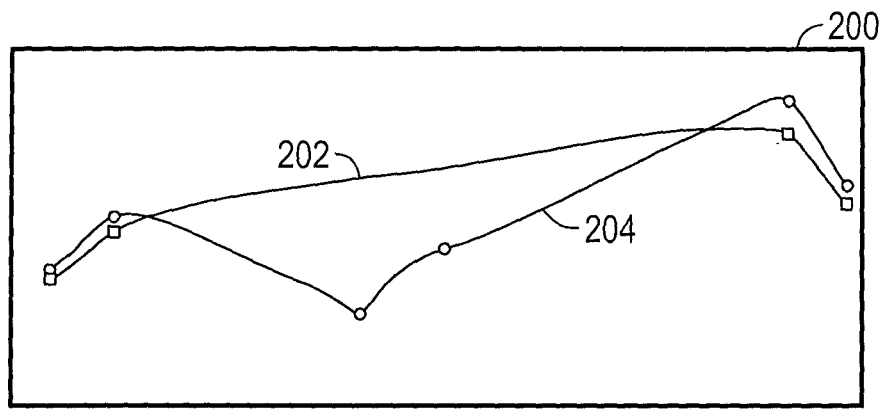
FIG. 2 is a geologic model illustrating a cross section view of two 3D geologic surfaces built using conventional techniques.

Referring now to FIG. 2, a geologic model 200 illustrates a cross section view of two 3D geologic surfaces built using conventional techniques. The first surface 202 is the constraining surface and the second surface 204 is the constrained surface that crosses the first surface 202. The points along each surface represent a respective set of 3D data points. Each surface was built using a respective set of 3D data points, independent of the other surface. The second surface 204 is known to lie entirely above the first surface 202, which is referred to as a conformance relationship. The first surface 202 intersects the second surface 204, however, because the 3D data points for one surface were not considered when building the other surface.

Figure 3:
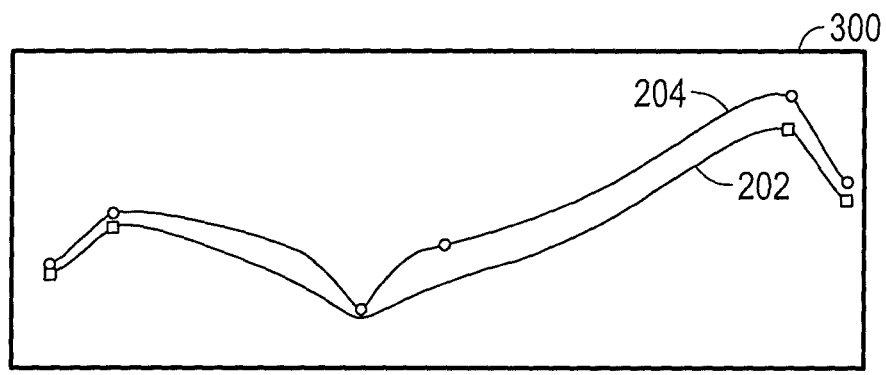
FIG. 3 is another geologic model illustrating a cross section view of two 3D geologic surfaces built using the method of the present disclosure and the same 3D data points used to build the two 3D geologic surfaces illustrated in FIG. 2

In FIG. 3, another geologic model 300 illustrates a cross section view of two 3D geologic surfaces built using the method 100 and the same 3D data points used to build the two 3D geologic surfaces illustrated in FIG. 2. Because the 3D data points for the second surface 204 (constrained surface) are used as maxima or minima while building the first surface 202 (constraining surface), the first surface 202 does not have any 3D data points from the second surface 204 on both sides of it and the surfaces do not intersect or overlap.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. DecisionSpace, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 4, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIG. 1. The memory therefore, includes a geologic surface modeling module, which enables steps 120-190 described in reference to FIG. 1. The geologic surface modeling module may integrate functionality from the remaining application programs illustrated in FIG. 4. In particular, DecisionSpace may be used as an interface application to perform the remaining steps in FIG. 1. Although DecisionSpace may be used as interface application, other interface applications may be used, instead, or the geologic surface modeling module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary-operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for modeling geologic surfaces using a constraining surface and a constrained surface, which comprises:
 a) approximating one of the constraining surface and the constraining surface and the constrained surface using a computer processor, each approximated surface representing a respective solution grid with at least four nodes, each node having an initialized value;
 b) determining simultaneous linear equations for solving the initialized values for the nodes on each respective solution grid using only three-dimensional data points for the respective one of the constraining surface and the constraining surface and the contained surface;
 c) performing one of:
  interpolating values for the constrained surface at x/y locations on the constrained surface corresponding to x/y locations of the nodes on the solution grid for the constraining surface using the three-dimensional data points for the constrained surface only at x/y locations that are closest to the x/y locations of the nodes on the solution grid for the constraining surface, the interpolated values representing interpolated values for nodes on the constrained surface; and
  approximating one of new values for the nodes on the solution grid for the constraining surface and new values for the nodes on the solution grids for the constraining surface and the constrained surface using the simultaneous linear equations and one of the initialized value for each node, new values for each respective node and adjusted values for each respective node; and
 d) performing one of:
  adjusting the new values for the nodes on the solution grid for the constraining surface that overlap the interpolated values for the nodes on the constrained surface; and
  adjusting i) the new values for the nodes on the solution grid for the constraining surface that overlap the new values for the nodes on the solution grid for the constrained surface, and ii) the new values for the nodes on the solution grid for the constrained surface that overlap the new values for the nodes on the solution grid for the constraining surface.

2. The method of claim 1, further comprising:
determining i) if the adjusted values for the nodes on one of the solution grid for the constraining surface and the solution grids for the constraining surface and the constrained surface represent an acceptable solution to the corresponding simultaneous linear equations, and ii) if a predetermined number of iterations of approximating new values has been reached; and
repeating the steps of approximating new values and adjusting the new values until one of an acceptable solution to the corresponding simultaneous linear equations and a predetermined number of iterations of approximating new values is reached.

3. The method of claim 2, further comprising:
determining if a predetermined grid resolution has been reached by one of the solution grid for the constraining surface and the solution grids for the constraining surface and the constrained surface;
halving a length of an interval between the nodes on one of the solution grid for the constraining surface and the solution grids for the constraining surface and the constrained surface in both x and y directions, each solution grid comprising new nodes that are initialized with the nodes and representing a new solution grid; and
repeating steps b)-d) in claim 1 and the steps in claim 2 until a predetermined grid resolution is reached.

4. The method of claim 3, wherein the predetermined grid resolution is reached when one of the solution grid for the constraining surface and the solution grids for the constraining surface and the constrained surface have enough nodes in the x and y directions to match a predetermined number of nodes in the x and y directions.

5. The method of claim 1, wherein the one of the constraining surface and the constraining surface and the constrained surface are approximated by dividing spatial extents for the respective surface into a two-node by two-node solution grid.

6. The method of claim 1, wherein the initialized value for the four nodes is one of zero and a median z-value of the three-dimensional data points for the respective surface.

7. The method of claim 1, wherein a number of the interpolated values is limited to the lesser of a number of nodes on the solution grid for the constraining surface and a number of the three-dimensional data points for the constrained surface.

8. The method of claim 1, wherein the new values for the nodes on the solution grid for the constraining surface that overlap the interpolated values for the nodes on the constrained surface are adjusted so that the constraining surface and the constrained surface do not intersect.

9. The method of claim 1, wherein the new values for the nodes on the solution grid for the constraining surface that overlap the new values for the nodes on the solution grid for the constrained surface and the new values for the nodes on the solution grid for the constrained surface that overlap the new values for the nodes on the solution grid for the constraining surface are simultaneously adjusted so that the constraining surface and the constrained surface do not intersect.

10. A non-transitory program carrier device tangibly carrying computer-executable instructions for modeling geologic surfaces using a constraining surface and a constrained surface, the instructions being executable to implement:

a) approximating one of the constraining surface and the constraining surface and the constrained surface, each approximated surface representing a respective solution grid with at least four nodes, each node having an initialized value;

b) determining simultaneous linear equations for solving the initialized values for the nodes on each respective solution grid using only three-dimensional data points for the respective one of the constraining surface and the constraining surface and the contained surface;

c) performing one of:
interpolating values for the constrained surface at x/y locations on the constrained surface corresponding to x/y locations of the nodes on the solution grid for the constraining surface using the three-dimensional data points for the constrained surface only at x/y locations that are closest to the x/y locations of the nodes on the solution grid for the constraining surface, the interpolated values representing interpolated values for nodes on the constrained surface; and
approximating one of new values for the nodes on the solution grid for the constraining surface and new values for the nodes on the solution grids for the constraining surface and the constrained surface using the simultaneous linear equations and one of the initialized value for each node, new values for each respective node and adjusted values for each respective node; and d) performing one of:
adjusting the new values for the nodes on the solution grid for the constraining surface that overlap the interpolated values for the nodes on the constrained surface; and
adjusting i) the new values for the nodes on the solution grid for the constraining surface that overlap the new values for the nodes on the solution grid for the constrained surface, and ii) the new values for the nodes on the solution grid for the constrained surface that overlap the new values for the nodes on the solution grid for the constraining surface.

11. The program carrier device of claim 10, further comprising:
determining i) if the adjusted values for the nodes on one of the solution grid for the constraining surface and the solution grids for the constraining surface and the constrained surface represent an acceptable solution to the corresponding simultaneous linear equations, and ii) if a predetermined number of iterations of approximating new values has been reached; and
repeating the steps of approximating new values and adjusting the new values until one of an acceptable solution to the corresponding simultaneous linear equations and a predetermined number of iterations of approximating new values is reached.

12. The program carrier device of claim 11, further comprising:
determining if a predetermined grid resolution has been reached by one of the solution grid for the constraining surface and the solution grids for the constraining surface and the constrained surface; and
halving a length of an interval between the nodes on one of the solution grid for the constraining surface and the solution grids for the constraining surface and the constrained surface in both x and y directions, each solution grid comprising new nodes that are initialized with the nodes and representing a new solution grid; and repeating steps b)-d) in claim 10 and the steps in claim 11 until a predetermined grid resolution is reached.

13. The program carrier device of claim 12, wherein the predetermined grid resolution is reached when one of the solution grid for the constraining surface and the solution grids for the constraining surface and the constrained surface have enough nodes in the x and y directions to match a predetermined number of nodes in the x and y directions.

14. The program carrier device of claim 10, wherein the one of the constraining surface and the constraining surface and the constrained surface are approximated by dividing spatial extents for the respective surface into a two-node by two-node solution grid.

15. The program carrier device of claim 10, wherein the initialized value for the four nodes is one of zero and a median z-value of the three-dimensional data points for the respective surface.

16. The program carrier device of claim 10, wherein a number of the interpolated values is limited to the lesser of a number of nodes on the solution grid for the constraining surface and a number of the three-dimensional data points for the constrained surface.

17. The program carrier device of claim 10, wherein the new values for the nodes on the solution grid for the constraining surface that overlap the interpolated values for the nodes on the constrained surface are adjusted so that the constraining surface and the constrained surface do not intersect.

18. The program carrier device of claim 10, wherein the new values for the nodes on the solution grid for the constraining surface that overlap the new values for the nodes on the solution grid for the constrained surface and the new values for the nodes on the solution grid for the constrained surface that overlap the new values for the nodes on the solution grid for the constraining surface are simultaneously adjusted so that the constraining surface and the constrained surface do not intersect.

19. A non-transitory program carrier device tangibly carrying computer-executable instructions for modeling geologic surfaces using a constraining surface and a constrained surface, the instructions being executable to implement:
 a) approximating one of the constraining surface and the constraining surface and the constrained surface, each approximated surface representing a respective solution grid with at least four nodes, each node having an initialized value;
 b) determining simultaneous linear equations for solving the initialized values for the nodes on each respective solution grid using three-dimensional data points for the respective one of the constraining surface and the constraining surface and the contained surface;
 c) performing one of:
  interpolating values for the constrained surface at x/y locations on the constrained surface corresponding to x/y locations of the nodes on the solution grid for the constraining surface using the three-dimensional data points for the constrained surface at x/y locations that are closest to the x/y locations of the nodes on the solution grid for the constraining surface, the interpolated values representing interpolated values for nodes on the constrained surface; and
  approximating one of new values for the nodes on the solution grid for the constraining surface and new values for the nodes on the solution grids for the constraining surface and the constrained surface using the simultaneous linear equations and one of the initialized value for each node, new values for each respective node and adjusted values for each respective node;
 d) performing one of:
  adjusting the new values for the nodes on the solution grid for the constraining surface that overlap the interpolated values for the nodes on the constrained surface; and
  adjusting i) the new values for the nodes on the solution grid for the constraining surface that overlap the new values for the nodes on the solution grid for the constrained surface, and ii) the new values for the nodes on the solution grid for the constrained surface that overlap the new values for the nodes on the solution grid for the constraining surface;
 e) determining i) if the adjusted values for the nodes on one of the solution grid for the constraining surface and the solution grids for the constraining surface and the constrained surface represent an acceptable solution to the corresponding simultaneous linear equations, and ii) if a predetermined number of iterations of approximating new values has been reached; and
 f) repeating the steps of approximating new values and adjusting the new values until one of an acceptable solution to the corresponding simultaneous linear equations and a predetermined number of iterations of approximating new values is reached.

20. The program carrier device of claim 19, further comprising:
 determining if a predetermined grid resolution has been reached by one of the solution grid for the constraining surface and the solution grids for the constraining surface and the constrained surface;
 halving a length of an interval between the nodes on one of the solution grid for the constraining surface and the solution grids for the constraining surface and the constrained surface in both x and y directions, each solution grid comprising new nodes that are initialized with the nodes and representing a new solution grid; and
 repeating steps b)-f) in claim 19 until a predetermined grid resolution is reached.

* * * * *